US012404980B1

(12) United States Patent
Zheng

(10) Patent No.: US 12,404,980 B1
(45) Date of Patent: Sep. 2, 2025

(54) DOWNLIGHT

(71) Applicant: JOININ GLOBAL PTE.LTD., Sg (SG)

(72) Inventor: Hongbing Zheng, Hangzhou (CN)

(73) Assignee: JOININ GLOBAL PTE.LTD., Singapore (SG)

( * ) Notice: Subject to any disclaimer, the term of this patent is extended or adjusted under 35 U.S.C. 154(b) by 0 days.

(21) Appl. No.: 18/823,744

(22) Filed: Sep. 4, 2024

(30) Foreign Application Priority Data

Jul. 9, 2024 (CN) ........................ 202421613881.X

(51) Int. Cl.
*F21S 8/02* (2006.01)
*F21V 5/00* (2018.01)
*F21V 7/00* (2006.01)
*F21Y 105/18* (2016.01)
*F21Y 115/10* (2016.01)

(52) U.S. Cl.
CPC ..................................... *F21S 8/02* (2013.01); *F21V 5/00* (2013.01); *F21V 7/0066* (2013.01); *F21Y 2105/18* (2016.08); *F21Y 2115/10* (2016.08)

(58) Field of Classification Search
CPC .. F21S 8/02; F21S 8/026; F21V 21/04; F21V 5/00; F21Y 105/18
See application file for complete search history.

(56) References Cited

U.S. PATENT DOCUMENTS 10,704,779 B1 * 7/2020 Zhang ..................... F21V 14/06
2018/0080636 A1 * 3/2018 Burt ......................... F21V 29/89

* cited by examiner

*Primary Examiner* — William J Carter
(74) *Attorney, Agent, or Firm* — IPRTOP LLC

(57) ABSTRACT

A downlight comprising a back cover, a LED light panel, a hollow ring, and a diffuser panel is provided. A bottom and a sidewall of the back cover constitute an accommodation space. An end of the sidewall away from the bottom has an opening. The LED light panel is disposed at the bottom of the back cover. The hollow ring is disposed at the opening of the back cover. An inner sidewall of the hollow ring extends along an axis of the hollow ring, and is made of light-transmitting material, allowing light from the LED light panel to pass through. The diffuser panel is disposed at a hollow of the hollow ring. The downlight of the present disclosure can present one or two glowing rings, and the hollow ring can either emit light from the entire surface or just from the two sidewalls, meeting different lighting needs and aesthetic preferences.

9 Claims, 3 Drawing Sheets

DOWNLIGHT

FIELD OF TECHNOLOGY

The present disclosure belongs to the technical field of lighting equipment, and specifically relates to a downlight.

BACKGROUND

LED downlights are popular for indoor lighting in bedrooms, living rooms, bathrooms, and other spaces because they provide uniform, soft light. These recessed fixtures save space and can create various lighting effects using different light sources, light guides, and diffusers, enhancing the ambiance of any room.

However, most LED downlights on the market focus primarily on front lighting for main illumination, often neglecting the creation of a cozy atmosphere. Currently, many night lights use side lighting, but this single method doesn't fully meet users' needs for diverse lighting effects.

SUMMARY

In view of the above-mentioned shortcomings of the prior art, the present disclosure provides a downlight, which addresses the technical issue of existing downlights having a single lighting mode when used as a night light.

The present disclosure provides a downlight comprising a back cover, a LED light panel, a hollow ring, and a diffuser panel. A bottom and a sidewall of the back cover constitute an accommodation space, and a first end of the sidewall away from the bottom has an opening. The LED light panel is disposed at the bottom of the back cover. The hollow ring is disposed at the opening of the back cover, an inner sidewall of the hollow ring extends along an axis of the hollow ring, and the inner sidewall is made of light-transmitting material, allowing light from the LED light panel to pass through. And the diffuser panel is disposed at a hollow of the hollow ring.

In an embodiment of the present disclosure, the hollow ring further comprises an outer sidewall extending along the axis of the hollow ring, and the outer sidewall is made of light-transmitting material, allowing the light from the LED light panel to pass through.

In an embodiment of the present disclosure, the hollow ring has a two-layer structure, comprising an upper panel and a lower panel, the lower panel is integrally molded with the outer sidewall and the inner sidewall, and the upper panel is fixed to the lower panel.

In an embodiment of the present disclosure, limiting holes are uniformly disposed at a peripheral of the lower panel, bumps are disposed at the upper panel, and each of the limiting holes fits into one of the bumps, such that the upper panel is fixed to the lower panel.

In an embodiment of the present disclosure, the lower panel is made of light-transmitting material. The upper panel is made of one of the light-transmitting material and opaque material.

In an embodiment of the present disclosure, the upper panel and lower panel of the hollow ring are formed by one-piece molding.

In an embodiment of the present disclosure, a reflector cup is disposed between the LED light panel and the hollow ring, the reflector cup is provided with snaps, the inner sidewall is provided with snap points, and each of the snaps fits into one of the snap points to secure the reflector cup to the hollow ring.

In an embodiment of the present disclosure, the LED light panel is provided with night light lamp beads and main light lamp beads. The night light lamp beads are located on the LED light panel within a projective region corresponding to the hollow ring. The main light lamp beads are located on the LED light panel within a projective region corresponding to the diffuser panel.

In an embodiment of the present disclosure, the night light lamp beads and the main light lamp beads are arranged in a pre-designed pattern.

In an embodiment of the present disclosure, a cross-sectional diameter of the accommodation space decreases from the first end of the sidewall near the hollow ring to a second end of the sidewall near the bottom.

As described above, the downlight of the present disclosure has following beneficial effects.

(1) By choosing light-transmitting material for the sidewalls, the downlight of the present disclosure can present one or two glowing rings; and by choosing the material of the upper panel, the hollow ring can either emit light from the entire surface or just from the two sidewalls, meeting different lighting needs and aesthetic preferences.

(2) By welding the main light lamp beads and night light lamp beads on the same LED light panel, it improves the welding efficiency and reduces the risk of poor welds, ensuring the quality and reliability of the product.

(3) The snaps of the reflector cup fit into the snap points of the hollow ring, which simplifies the installation process and enhances the overall stability of the lamp. Meanwhile, the upper panel of the hollow ring is fixed to the lower panel using the limiting holes and the bumps, which further ensures the structural strength of the lamp.

(4) The night light lamp beads and the main light lamp beads are arranged in a pre-designed pattern, enabling the downlight to provide sufficient lighting while creating a warm and harmonious atmosphere; the concentric ring arrangement ensures more uniform light distribution, reduces shadows, and improves the quality of illumination.

REFERENCE NUMERALS

1 Back Cover
2 LED Light Panel
21 Night Light Lamp Bead
22 Main Light Lamp Bead
3 Hollow Ring

31 Lower Panel
32 Upper Panel
33 Limiting Hole
34 Bump
35 Inner Sidewall
36 Outer Sidewall
4 Diffuser Panel
5 Reflector Cup
51 Snap
52 Snap Spot

DETAILED DESCRIPTION

The embodiments of the present disclosure will be described below through exemplary embodiments. Those skilled in the art can easily understand other advantages and effects of the present disclosure according to the contents disclosed by the specification. The present disclosure may also be implemented or applied through other different specific implementation modes. Various modifications or changes may be made to all details in the specification based on different points of view and applications without departing from the spirit of the present disclosure. It needs to be stated that the following embodiments and the features in the embodiments can be combined under the situation of no conflict.

It needs to be stated that the drawings provided in the following embodiments are just used for schematically describing the basic concept of the present disclosure, thus only illustrating components related to the present disclosure and are not drawn according to the numbers, shapes and sizes of components during actual implementation, the configuration, number and scale of each component during actual implementation thereof may be freely changed, and the component layout configuration thereof may be more complicated.

Furthermore, descriptions such as "first", "second", and the like in the present disclosure are used for descriptive purposes only, and are not to be understood as indicating or implying their relative importance or implicitly specifying the number of technical features indicated. As a result, a feature defined as "first" or "second" may include at least one such feature, either explicitly or implicitly. In addition, the technical solutions between the various embodiments can be combined with each other, but it must be based on the fact that the person skilled in the art can realize it, and when the combination of the technical solutions appears to be contradictory or unrealizable it should be considered that the combination of such technical solutions does not exist, and is not within the protection scope required by the present disclosure.

The present disclosure provides a downlight that offers a softer, more uniform night light function, which is easy to install, all while maintaining a slim design.

The following will elaborate on the principle and implementation of the downlight of the present embodiment in conjunction with the accompanying drawings, so that those skilled in the art can understand the downlight of the present embodiment without the creative labor.

Figure 1:
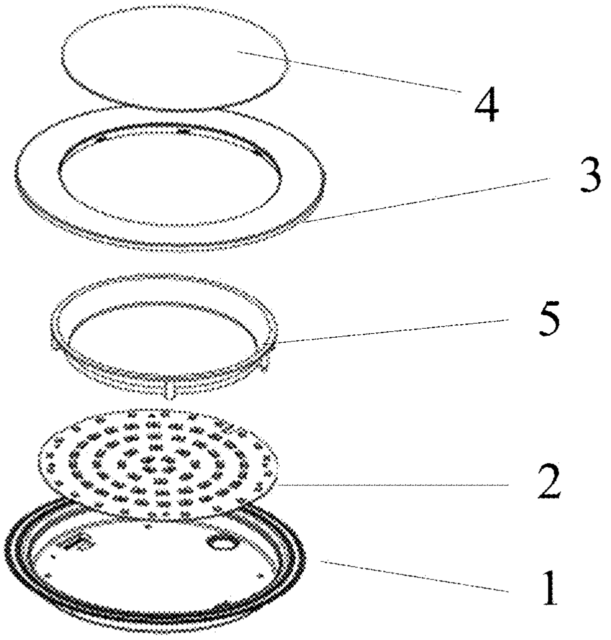
FIG. 1 shows an exploded view of a downlight according to a first embodiment of the present disclosure.

As in FIG. 1, the downlight of the present disclosure comprises a back cover 1, an LED light panel 2, a hollow ring 3, and a diffuser panel 4.

A bottom and a sidewall of the back cover 1 constitute an accommodation space. A first end of the sidewall away from the bottom has an opening.

In some embodiments, the accommodation space has a cylindrical structure, and its cross-sectional diameter gradually decreases from the first end of the sidewall near the hollow ring 3 to a second end near the bottom.

Specifically, as the cross-sectional diameter decreases, light passing through the hollow ring 3 and the diffuser panel 4 achieves better focus and diffusion. The light is more effectively directed and controlled at the first end of the sidewall, creating a more focused illumination; and the light is spread evenly through the diffuser panel 4 at the second end of the sidewall, creating a soft and uniform illumination. Additionally, this structural design can also improve the stability and safety of downlight installation. The smaller diameter at the bottom makes it easier to embed the downlight into ceiling openings of different sizes and allows a more secure fit, reducing the risk of lamp falling due to improper installation.

The hollow ring 3 is disposed at the opening of the back cover. An inner sidewall 35 of the hollow ring 3 extends along an axis of the hollow ring 3, and is made of light-transmitting material, allowing the light from the LED light panel to pass through.

By placing the hollow ring 3 at the opening of the back cover 1 of the downlight, configuring the hollow ring 3 with the inner sidewall 35 extending along its axis, and adopting the light-transmitting material to manufacture the inner sidewall 35, the downlight of the present disclosure allows the light from the LED light panel to pass through efficiently, creating a glowing ring effect. This design not only provides balanced and comfortable illumination, but also meets the aesthetic demands of modern consumers for lighting products.

In some embodiments, the hollow ring 3 further comprises an outer sidewall 36 extending along the axis of the hollow ring 3, the outer sidewall 36 is made of light-transmitting material, allowing the light from the LED light panel to pass through.

By configuring the hollow ring 3 with the outer sidewall 36, and adopting the light-transmitting material to manufacture the outer sidewall 36, both the inner sidewall 35 and the outer sidewall 36 can form independent glowing rings when light passes through them. These two glowing rings work together to create a unique visual and optical effect, which transforms the downlight from a single light source into a lighting device with multiple layers of illumination.

Furthermore, the hollow ring 3 has a two-layer structure, comprising a lower panel 31 and an upper panel 32. The lower panel 31 is integrally molded with the outer sidewall 36 and the inner sidewall 35, and the upper panel 32 is fixed to the lower panel 31.

Figure 2:
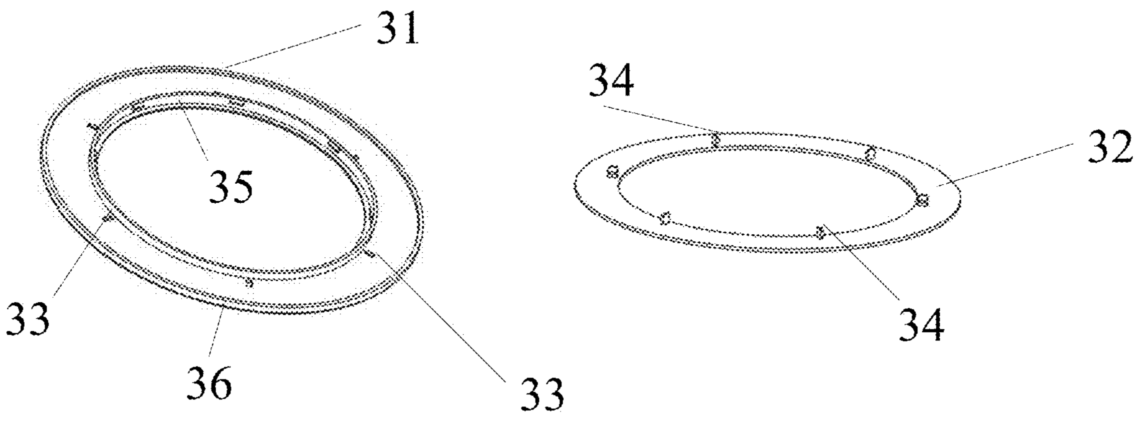
FIG. 2 shows a schematic diagram of an upper panel and a lower panel of the downlight according to the first embodiment of the present disclosure.

FIG. 2 is a schematic diagram of the upper panel 32 and the lower panel 31. To enhance the fixation and alignment between the two panels (i.e., the lower panel 31 and the upper panel 32), limiting holes 33 are uniformly disposed at a peripheral of the lower panel 31, and bumps 34 corresponding to the limiting holes 33 are disposed at the upper panel 32, such that the limiting holes 33 and the bumps 34 fit together, ensuring precise alignment and secure fixation of the upper and lower panels during assembly.

This design also prevents the components from moving or detaching due to vibrations or other external forces during use, ensuring the long-term stability and safety of the lamp. In addition, the fixing of the panels considers the ease of maintenance and disassembly, allowing for quick and convenient access when replacing bulbs or performing maintenance.

In some embodiments, the lower panel 31 of the hollow ring 3 is designed to be very thin and made of light-transmitting material. This thin design reduces the weight of the lamp.

The upper panel 32 can be made of either light-transmitting material or opaque material according to different lighting requirements.

Figure 3:
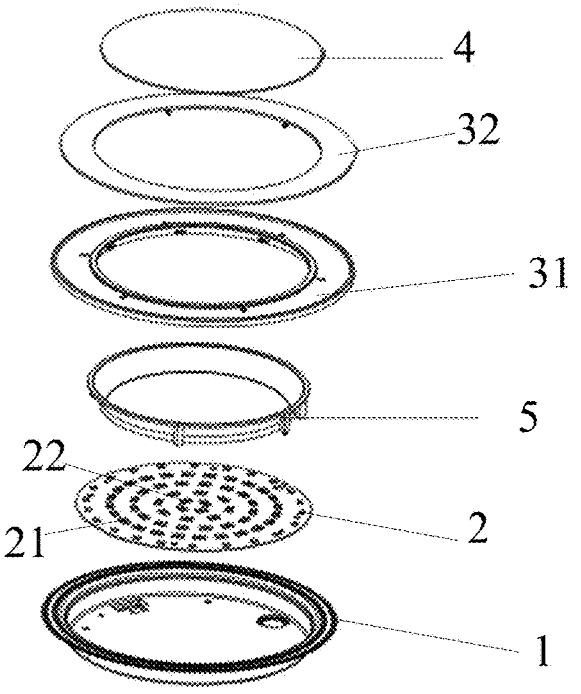
FIG. 3 shows an exploded view of a downlight according to a second embodiment of the present disclosure.
Figure 4:
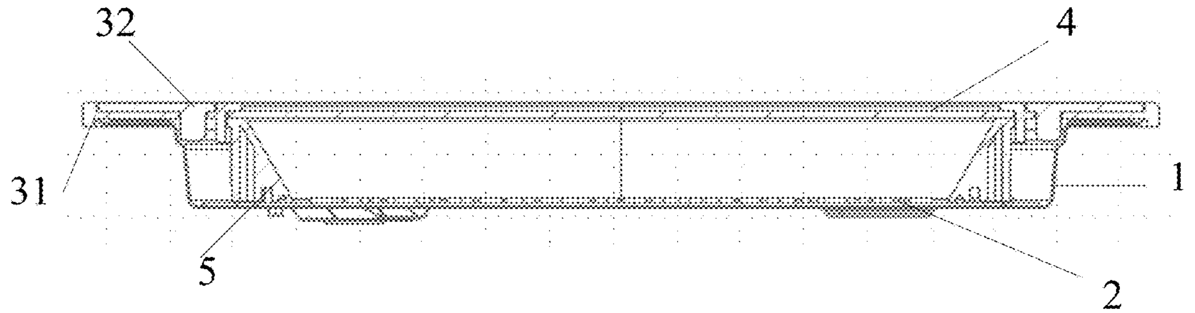
FIG. 4 shows a cross-sectional view of the downlight according to the second embodiment of the present disclosure.

FIG. 3 shows an exploded view of a downlight with an upper panel made of opaque material. In this embodiment, the downlight can present a visual effect of a dual light ring, effectively scattering light, providing uniform and soft illumination while significantly reducing glare, making it suitable for creating a warm and comfortable environment, such as in homes, hotels or hospital wards. To better illustrate the structure of the downlight, a cross-sectional view of the downlight is shown in FIG. 4.

Figure 5:
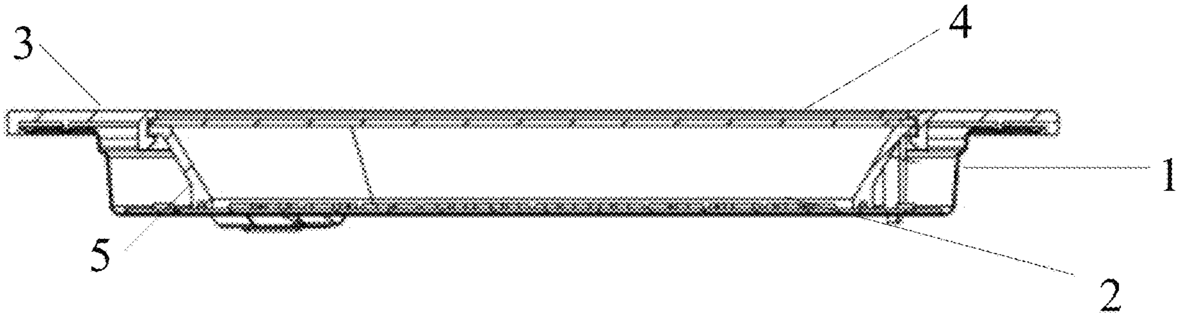
FIG. 5 shows a cross-sectional view of the downlight according to the first embodiment of the present disclosure.

Refer back to FIG. 1, which shows an exploded view of the downlight with the upper panel made of light-transmitting material. In this embodiment, the lower panel 31 and the upper panel 32 are both made of light-transmitting material, keeping the entire hollow ring 3 transparent and minimally affecting the light's color and intensity, allowing LED lamp beads to maintain their original light characteristics and resulting in uniform light emission from the entire hollow ring 3. This design allows more light to pass through directly, creating a brighter illumination effect, suitable for environments requiring high brightness and clear lighting, such as offices, shopping malls or exhibition halls. To better illustrate the structure of the downlight, a cross-sectional view of the downlight is shown in FIG. 5.

Further, to simplify the production process and reduce the assembly steps, in some embodiments, the lower panel 31 and the upper panel 32 are formed by one-piece molding.

The diffuser panel 4 is disposed at the hollow of the hollow ring 3.

Specifically, the diffuser panel 4 is mainly used to evenly disperse the light emitted from the LED light panel 2. Since the light emitted from LED beads is usually a point source, direct illumination may cause glare or uneven lighting. The diffuser panel 4, through its surface microstructure or material properties, can refract, reflect, and scatter the light as it passes through, achieving soft light, reducing shadows, and improving light uniformity. The diffuser panel 4 is usually made of high-transmittance plastic or glass material, which not only have good optical properties but also ensure long-term durability and stability.

Furthermore, in this embodiment, the diffuser panel 4 is fixed to the hollow of the hollow ring 3, that is, the diffuser panel 4, together with the hollow ring 3, encloses the accommodation space, which prevents dust and insects, etc. from entering the interior of the lamp, protecting the LED light panel 2 from contamination and damage.

The LED light panel 2 is disposed at the bottom of the back cover 1, and the LED light panel 2 is provided with night light lamp beads 21 and main light lamp beads 22.

In some embodiments, the night light lamp beads 21 are located on the LED light panel 2 within a projective region corresponding to the hollow ring 3; the main light lamp beads 22 are located on the LED light panel 2 within a projective region corresponding to the diffuser panel 4.

This partitioned design enables the night light lamp beads 21 and the main light lamp beads 22 to serve different lighting roles, with the night light lamp beads 21 being responsible for providing auxiliary lighting and the main light lamp beads 22 being responsible for providing primary lighting.

To optimize the lighting effect, the night light lamp beads 21 and the main light lamp beads 22 can be arranged in a pre-designed pattern.

For example, as shown in FIG. 3, the night light lamp beads 21 can be arranged in at least two concentric rings, with the beads evenly distributed in each ring. Similarly, the main light lamp beads 22 can also be arranged in at least two concentric rings, with the beads evenly distributed in each ring.

In some embodiments, to achieve an effective partitioning between the night light lamp beads 21 and the main light lamp beads 22 and to optimize light propagation, a reflector cup 5 is further disposed between the LED light panel 2 and the hollow ring 3. The reflector cup 5 is mainly used to focus and guide the light emitted from the LED light panel 2, reducing light scattering and loss, thereby increasing light efficiency. The reflector cup 5 is usually made of high-reflectivity material, such as metals or high-reflectivity plastics, to ensure effective light reflection.

Figure 6:
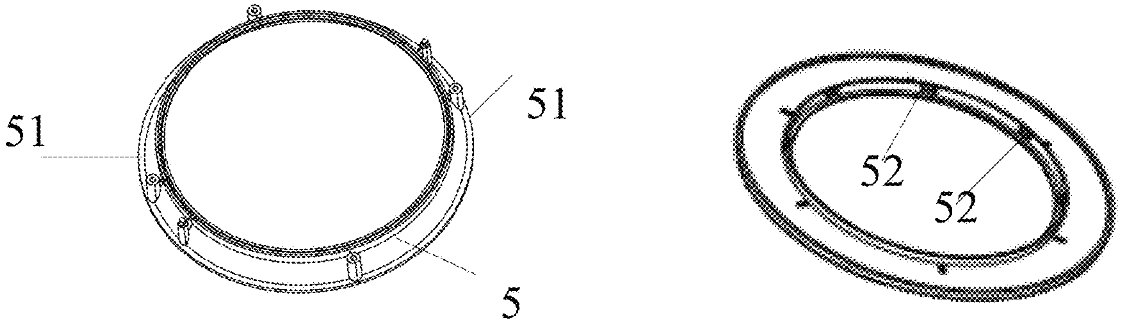
FIG. 6 shows a schematic diagram of a reflector cup and the lower panel according to an embodiment of the present disclosure.

As an example shown in FIG. 6, the reflector cup 5 is provided with snaps 51, and the inner sidewall of the hollow ring 3 is provided with snap points 52 corresponding to the snaps 51. Each of the snaps 51 fits into one of the snap points 52, securing the reflector cup 5 to the hollow ring 3.

Figure 7:
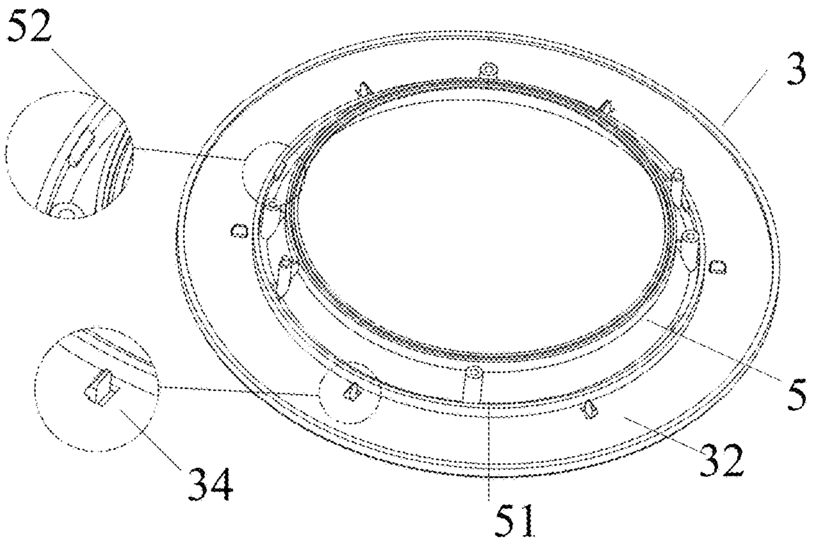
FIG. 7 shows a schematic diagram of the reflector cup installed on a hollow ring according to an embodiment of the present disclosure.

As shown in FIG. 7, the fixed way of the snaps 51 and the snap points 52 simplifies the assembly process of the downlight, allowing the reflector cup 5 to be quickly and easily installed to the hollow ring 3. In addition, the fixed way is reversible, making maintenance and replacement convenient.

In summary, by choosing light-transmitting material for the sidewall, the downlight of the present disclosure can present one or two glowing rings; by choosing the material of the upper panel, the hollow ring can either emit light from the entire surface or just from the two sidewalls, meeting different lighting needs and aesthetic preferences. Moreover, the night light lamp beads and the main light lamp beads are mounted on the same LED light panel which simplifies the circuit structure. In addition, the outer sidewall, the inner sidewall, and the reflector cup is designed with snaps to improve assembly efficiency and stability. The outer sidewall adopts a slim design, ensuring aesthetics and comfort in the interior space after installation.

The descriptions of the processes or structures corresponding to each of the above accompanying drawings have their own focuses, and the parts that are not described in detail in a certain process or structure can be found in the relevant descriptions of other processes or structures.

The above-mentioned embodiments are merely illustrative of the principle and effects of the present disclosure instead of limiting the present disclosure. Modifications or variations of the above-described embodiments may be made by those skilled in the art without departing from the spirit and scope of the disclosure. Therefore, all equivalent modifications or changes made by those skilled in the art without departing from the spirit and technical concept disclosed by the present disclosure shall be still covered by the claims of the present disclosure.

What is claimed is:

1. A downlight, comprising:

a back cover, wherein a bottom and a sidewall of the back cover constitute an accommodation space, and a first end of the sidewall away from the bottom has an opening;

a LED light panel, disposed at the bottom of the back cover;

a hollow ring, disposed at the opening of the back cover, wherein an inner sidewall of the hollow ring extends along an axis of the hollow ring, and the inner sidewall is made of light-transmitting material, allowing light from the LED light panel to pass through; and a diffuser panel, disposed at a hollow of the hollow ring;

wherein the LED light panel is provided with night light lamp beads and main light lamp beads;

wherein the night light lamp beads are located on the LED light panel within a projective region corresponding to the hollow ring;

wherein the main light lamp beads are located on the LED light panel within a projective region corresponding to the diffuser panel.

2. The downlight according to claim 1, wherein the hollow ring further comprises an outer sidewall extending along the axis of the hollow ring, and the outer sidewall is made of light-transmitting material, allowing the light from the LED light panel to pass through.

3. The downlight according to claim 2, wherein the hollow ring has a two-layer structure, comprising an upper panel and a lower panel, wherein the lower panel is integrally molded with the outer sidewall and the inner sidewall, and the upper panel is fixed to the lower panel.

4. The downlight according to claim 3, wherein limiting holes are uniformly disposed at a peripheral of the lower panel 34, bumps are disposed at the upper panel, and each of the limiting holes fits into one of the bumps, such that the upper panel is fixed to the lower panel.

5. The downlight according to claim 3, wherein the lower panel is made of light-transmitting material, and the upper panel is made of one of the light-transmitting material and opaque material.

6. The downlight according to claim 3, wherein the upper panel and lower panel are formed by one-piece molding.

7. The downlight according to claim 1, wherein a reflector cup is disposed between the LED light panel and the hollow ring, the reflector cup is provided with snaps, the inner sidewall is provided with snap points, and each of the snaps fits into one of the snap points to secure the reflector cup to the hollow ring.

8. The downlight according to claim 1, wherein the night light lamp beads and the main light lamp beads are arranged in a pre-designed pattern.

9. The downlight according to claim 1, wherein a cross-sectional diameter of the accommodation space decreases from the first end of the sidewall near the hollow ring to a second end of the sidewall near the bottom.

* * * * *